United States Patent
Miyasato et al.

[11] Patent Number: 5,865,911
[45] Date of Patent: *Feb. 2, 1999

[54] ALUMINUM ALLOY PRODUCTS SUITED FOR COMMERCIAL JET AIRCRAFT WING MEMBERS

[75] Inventors: Shelly M. Miyasato; Gary H. Bray, both of Murrysville; John Liu, Lower Burrell; James T. Staley, Murrysville, all of Pa.

[73] Assignee: Aluminum Company of America, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 451,643

[22] Filed: May 26, 1995

[51] Int. Cl.$^6$ ..................... C22C 21/06
[52] U.S. Cl. ............ 148/439; 148/438; 148/440; 148/690; 148/693; 148/694; 148/701; 420/533; 244/123; 244/124
[58] Field of Search ................... 148/438, 439, 148/440, 690, 693, 694, 701; 420/533; 244/123, 124

[56] References Cited

U.S. PATENT DOCUMENTS

| | | | |
|---|---|---|---|
| Re. 34,008 | 7/1992 | Quist et al. | 148/417 |
| 3,645,804 | 2/1972 | Ponchel | 148/502 |
| 3,881,966 | 5/1975 | Staley et al. | 148/502 |
| 4,294,625 | 10/1981 | Hyatt et al. | 148/550 |
| 4,477,292 | 10/1984 | Brown | 148/502 |
| 4,711,762 | 12/1987 | Vernam et al. | 148/417 |
| 4,832,758 | 5/1989 | Brown | 148/695 |
| 4,863,528 | 9/1989 | Brown et al. | 148/695 |
| 5,035,754 | 7/1991 | Sakiyama et al. | 148/701 |
| 5,108,520 | 4/1992 | Liu et al. | 148/701 |
| 5,221,377 | 6/1993 | Hunt, Jr. et al. | 148/417 |

FOREIGN PATENT DOCUMENTS

57-158360  9/1982  Japan .

Primary Examiner—Sikyin Ip
Attorney, Agent, or Firm—Carl R. Lippert; Charles Q. Buckwalter

[57] ABSTRACT

Rolled plate products up to 6 inches thick or more and other products in an aluminum alloy consisting essentially of about 5.2 to 6.8% zinc, 1.7 to 2.4% copper, 1.6 to 2% magnesium, 0.03 to 0.3% zirconium, balance substantially aluminum and incidental elements and impurities, are useful in making structural members for commercial airplanes especially by machining or shaping such members from the plate. Such members include lower wing skins and wing spars and other members. The plate is made by operations comprising homogenization, hot rolling, solution heat treatment, stretching and artificial aging. Alternatively, the plate is shaped after stretching, which may include machining, and is then artificially aged.

46 Claims, 4 Drawing Sheets

AGE FORMING RESPONSE
FIG. 4

S/N FATIGUE COMPARISON
FIG. 5

FATIGUE CRACK GROWTH COMPARISON

# ALUMINUM ALLOY PRODUCTS SUITED FOR COMMERCIAL JET AIRCRAFT WING MEMBERS

This invention pertains to aluminum alloy rolled plate products useful as a structural wing member or other members for a large commercial aircraft. More specifically, the invention pertains to an aluminum alloy material and its manufacture for use largely as lower wing skin structural members and for wing spar members.

BACKGROUND

There are numerous commercial jet aircraft of various sizes including the large "jumbo jet" aircraft, such as the Boeing 747 and the McDonnell Douglas MD11 and the Lockheed L1011. In going to a still larger aircraft, such as a 600-passenger aircraft envisioned for the future, the loads on the wing member needed to hold the airplane aloft are heightened some. These large aircraft will carry in the neighborhood of 600 passengers and may include two passenger decks. Whereas a Boeing 747 (one of the largest commercial jet aircraft in use) has an empty weight in the neighborhood of about 399,000 pounds, it is estimated that the high capacity aircraft envisioned will weigh in the neighborhood of 532,000 pounds empty and somewhere around 1,200,000 pounds loaded. High capacity aircraft as used herein refers to an aircraft weighing more than 450,000 pounds empty. To heighten efficiency in such an airplane, it would be important to have materials in the wing structures that can support the load of the airplane without themselves becoming too heavy. Aluminum alloys have seen wide use in airplane structural members, including airplane wing structural members, and have an enviable record for dependability and performance. More exotic, composite or other materials can be used for airplane wing structural members, but are much more costly and can be somewhat less dependable than aluminum alloys.

In general, the structural core of a large airplane wing can include a box-like structure made up of an upper wing skin, a lower wing skin, and end pieces to close the box-like beam structure. While the upper and lower members are labeled "skin", it is important to appreciate that these are not thin skins such as on the airplane fuselage, but rather, somewhat thick, for instance a half inch or more in thickness. In most of the current commercial jet aircraft, the upper wing skin is made of a 7000 Series alloy, currently a 7X50 alloy (7X50 is intended to refer to 7050 and 7150), or more recent alloy 7055. U.S. Pat. No. 3,881,966 describes 7X50 alloys and U.S. Reissue Pat. No. 34,008 describes 7150 alloy used as an upper wing skin on a commercial jet aircraft, and U.S. Pat. No. 5,221,377 describes alloy 7055 and refers to its use in airplane structural members. The upper wing skins were normally in artificially aged tempers such as T6-type or possibly T7-type tempers. U.S. Pat. Nos. 4,863,528, 4,832,758 and 4,477,292, along with U.S. Pat. No. 5,108,520, all describe tempers for 7000 type aluminum alloys, which said temper can be applied to the 7000 Series alloys just mentioned to improve performance. All the aforesaid patents (U.S. Pat. Nos. 3,881,966, Re. 34,008, 5,221,377, 4,863,528, 4,832,758, 4,477,292 and 5,108,520) are fully incorporated herein by reference.

In commercial jet aircraft, the lower wing skins have generally been made of aluminum alloy 2024 or similar products such as alloy 2324 which is included in U.S. Pat. No. 4,294,625, the entire content of which is incorporated herein by reference. The temper was normally T3-type such as T351 or T39. Temper and alloy designations used herein are generally those used in accordance with the Aluminum Association and are generally recognized in the art and described in the Aluminum Association Standards and Data book.

Both the upper and lower wing skins are often reinforced by stringer members which can have a channel or J-type shape or other shape which are riveted to the inside surfaces to stiffen the wing skins and thereby stiffen the wing box structure. In general, when a commercial jet aircraft is in flight, the upper wing skin is in compression, whereas the lower wing skin is in tension. An exception occurs when the airplane is on the ground where these stresses are reversed but at a much lower level since at that point the wing outboard of the landing gear pretty much just holds up its own weight. Thus, the more important applications are when the airplane is in flight which places the upper wing skin in compression and the lower wing skin in tension. An exception occurs in certain military airplanes which are designed to utilize their enormous power to weight ratio and are intended to fly upside down, right side up, or any condition between at enormous speeds.

Because of the particular loading differences encountered in commercial jet airplanes, the alloy selections were, for the most part, as just described. There have been some exceptions in that airplanes such as the Lockheed L1011 included 7075-T76 lower wing skins and stringers and the military KC135 fueler airplane included 7178-T6 lower wing skins and stringers. Another military airplane, the C5A, used 7075-T6 lower wing skins that were integrally stiffened by machining out metal. Military fighter planes such as the F4, F5E, F8, F16 and F18 have included lower wing materials of 7075 alloy or related 7475 alloy (F16 and F18). Nonetheless, over the years the airplane wing box structure has, for the most part, in commercial jet aircraft included a 7000 Series alloy upper wing skin and a lower wing skin of 2000 Series alloy, namely, 2024 or a member of the 2X24 alloy family.

The important desired properties for a lower wing skin in a high capacity and new commercial passenger jet aircraft include a higher strength than 2X24 alloys, a better fatigue life and improved fracture toughness over 2X24 materials. Because the airplane flies at high altitude where it is cold, fracture toughness at minus 65° F. has become a concern in new designs. Additional desirable features include age formability whereby the material can be shaped during artificial aging, together with good corrosion performance in the areas of stress corrosion cracking resistance and exfoliation corrosion resistance. Alloys used to date for lower wing skin members in commercial jet aircraft are all lacking in satisfying the needed levels for high capacity aircraft in one or more of these properties.

Figure 3:
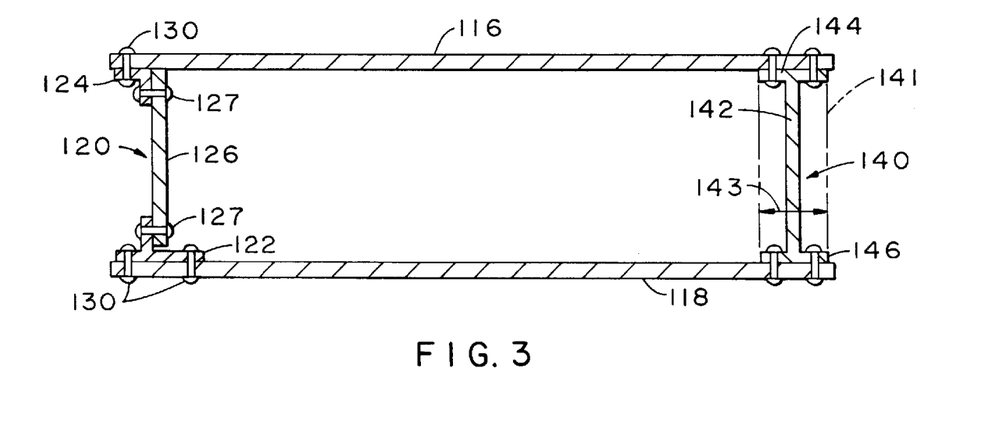
FIG. 3 is another elevation in section of the box-like wing beam structure showing different spar arrangements.

In the past, the wing box-like structure was often made from several pieces, as shown in FIG. 3, left side, wherein the end member or spar comprised a plate fastened to the upper and lower wing skins by riveting to angle or tee-like members, in turn riveted to the wing skins. Some builders prefer to make the entire end piece or spar as shown on the right side of FIG. 3 thus eliminating several rivets and considerable weight by reducing the amount of metal structure. This end piece or spar is made by machining from a thick plate but the plate needs good properties in the transverse directions as well as longitudinal direction.

SUMMARY OF THE INVENTION

In accordance with the invention, a lower wing skin for a commercial jet aircraft comprises a rolled plate member of an aluminum alloy consisting essentially of, broadly speaking, about 1.7 or 1.8 to about 2.3 or 2.4% copper, about 1.6 or 1.7 to about 2 or 2.1% magnesium, about 5.2 to about 6.7 or 6.8% zinc, about 0.03 to about 0.3% zirconium, the balance substantially aluminum and incidental elements and impurities. Composition percent is by weight unless indicated otherwise. This alloy in the form of rolled plates for lower wing skins or in the form of extrusions or rolled products for stringers incorporated into the lower wing structure, and particularly the combination of both, enables the production of an improved wing useful in a high capacity aircraft. Further, the same alloy can be used to machine long tapered spar members for the end pieces of the box-like wing structure from relatively thick plate.

FIGURES

FIGS. 1, 2 and 3 are exaggerated in some respects for schematic, illustrative purposes.

DETAILED DESCRIPTION

Figure 1:
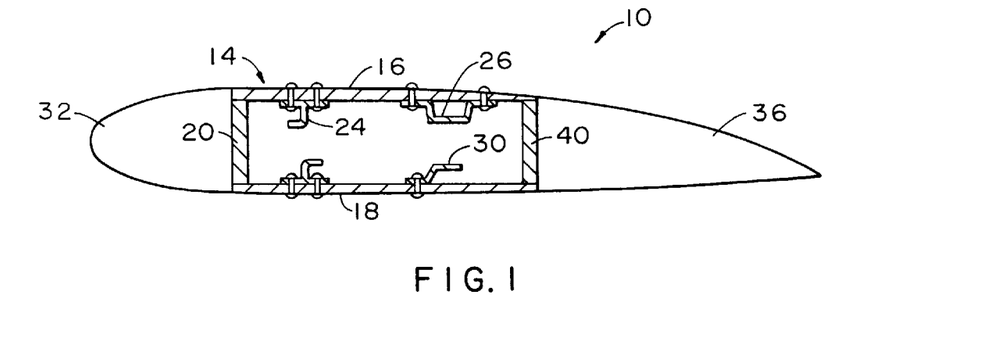
FIG. 1 is an elevation in section of an airplane wing showing the box-like beam strength structure members in a schematic sense.
Figure 2:
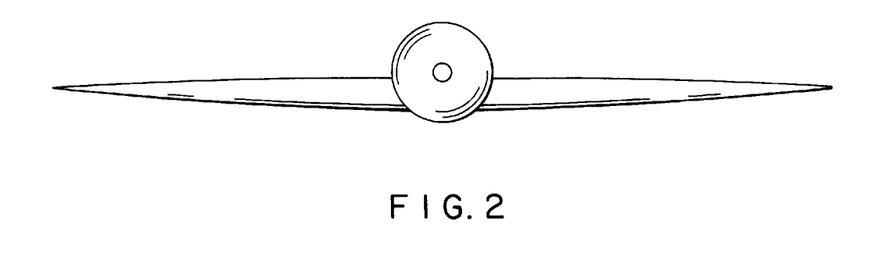
FIG. 2 is an elevation view of an airplane viewed from the front schematically illustrating the wing and some curvature therefor in a somewhat exaggerated form.

In FIG. 1 there is shown a rough schematic illustrating a large wing structure 10 including the box member 14 comprising an upper wing skin 16 and, spaced apart therefrom, a lower wing skin 18 and end members or spars 20 and 40 extending between the wing skin members 16 and 18 to close the box member. Included on the inside surfaces of the upper and lower wing skins are stringers 24, 26 and 30 riveted to the inside surfaces of the wing skins, there being different stringer shapes shown for purposes of illustration, it being remembered at all times that FIG. 1 is a rough schematic and not a scale or detail of a commercial jet aircraft wing. Another approach is to use a thicker aluminum plate starting material and by removal of metal by machining develop stringers integral with the wing skin and eliminate the need for separate stringers and rivets. Thus, the wing skin and stiffener stringer sections can constitute an integrally stiffened panel made from relatively thick plate by operations comprising machining and possibly age forming or other shaping techniques. The connection between end members 20 and 40, on one hand, and the upper and lower wing skins, on the other hand, is just shown schematically, there being numerous ways to bridge or connect those members. Ahead of the forward box member 20 is the leading part of the wing 32 shown schematically and aft or to the rearward is the rear part of the wing 36, also shown schematically. Each part, the forward part and the aft part, can contain numerous control and other parts which can be attached to the box 14. In looking at the box section along various points of the wing length, it is significant that the thickness of the upper wing skin 16 and the lower wing skin 18 is diminished proceeding further outwardly from the fuselage. That is, the wing skins are thicker closer to the fuselage and thinner closer to the wing tip. In addition, as shown in FIG. 2, the upper wing skin and lower wing skin converge toward the wing tip and can be curved going from the hull of the airplane out to the wing tip. This structure also enhances strength and illustrates some of the forming that is typically applied to the upper and lower wing skins such that performing this forming operation during artificial aging is a desirable feature if the alloy permits such, that is, if the alloy predictably and consistently responds in a repeatable way to attempt to age form it.

Referring to FIG. 3, upper wing skin 116 and spaced apart lower wing skin 118 are connected or bridged by end member spars 120 and 140 to make a rigid box-like structure. One way to make an end member-skin connection is shown in the left-hand side of FIG. 3 wherein plate-like member 126 is joined by rivets 127 to "L" section member 124 or "T" section member 122 which, in turn, are joined to the skin members by rivets 130. This arrangement is very effective but uses many rivets and adds weight over the more simple monolithic or integral spar member 140 shown on the right-hand side of FIG. 3 which avoids the extra weight of the rivet site overlap between web plate 126 and members 124 and 122. The spar member 140 includes a web portion 142 and integral upper flange portion 144 and lower flange portion 146. Since the upper and lower wing skins 116 and 118 converge toward the wing tip, the vertical length of web portion 142 is greater close to the hull and considerably less near the wing tip and also, since that convergence can be curved, as shown in FIG. 2, the height of web portion 142 can diminish in going toward the wing tip in a non-linear manner. The web 142 or either or both flange portions 144 or 146 can include thicker portions or boss portions for mounting attachments such as ancillary structures, hydraulic members or various other attachments. Integral spar member 140 can be machined or otherwise made or shaped (machining is currently used and is presently preferred) from a larger section of metal 141 (shown in phantom in FIG. 3) and that metal 141 can be rolled plate that is thick enough to provide the upper and lower flange portions 144 and 146. That is, dimension 143 corresponds to the short transverse direction (across the thickness) of the rolled plate. That thickness typically can range from around 3 inches to around 8 inches or possibly more, and typically is within 3½ or 4 inches to around 6 inches. For an integral spar 140, properties of concern include strength, both in compression for the upper wing skin region (when in flight), such as upper flange 144 portion, and in tension for the lower wing skin region (when in flight), such as lower flange 146 portion, together with toughness and corrosion resistance, for example, stress corrosion cracking resistance. In some aluminum alloys, toughness can be less in thicker sections (or metal machined from thick stock) than in metal rolled or worked into thinner stock, and it is desirable for an integral wing spar that good toughness be achieved in relatively thin sections such as web and flange portions 142 and 144 and 146 that are machined from thick stock 141. The flange portions of integral spar are riveted or connected to the spaced apart upper and lower wing skins and the spar bridges or connects across the distance the skins are spaced apart. This closes the box-like structure comprising the wing skins and spar members to provide a box-like beam structure to the wing.

In accordance with the invention, the upper wing skin may be made of the alloys described earlier for that purpose or other alloys. Preferably, the upper wing skin is made of alloy 7055 and consists essentially of about 7.6 to about 8.4% zinc, about 1.8 to about 2 or possibly 2.1% magnesium, about 2.1 to 2.6% copper, and about 0.03 to about 0.3% zirconium, the balance substantially aluminum and incidental elements and impurities.

In accordance with the invention, the lower wing skin or the material 141 for an integral spar, or both, are rolled plate products in an aluminum alloy consisting essentially of, broadly speaking, about 1.7 or 1.8 to about 2.3 or 2.4% copper, about 1.6 or 1.7 to 2 or 2.1% magnesium, about 5.2 to about 6.7 or 6.8% zinc, about 0.03 to about 0.3% zirconium, the balance aluminum and incidental elements and impurities. It is preferred that the zinc content of the alloy range from a lower limit of about 5.9 or 6 or 6.1 or 6.2% up to an upper limit of about 6.6 or 6.7 or 6.8%. A preferred zinc content is 6 to 6.6% zinc. The copper preferably ranges from a lower limit of about 1.75 or 1.8% to an upper limit of about 2.3 or 2.4%. A preferred range for copper is about 1.8 to 2.2% copper. The magnesium content ranges from a lower limit of about 1.6 or 1.65 or 1.7 or 1.75% or 1.8% to an upper limit of about 1.9 or 2% or possibly 2.1%. It is preferred that the upper limit for magnesium be around 2% or preferably less, for instance about 1.9 or 1.95 or 1.97%, to enhance toughness. Preferred zirconium content is about 0.08 to about 0.15 or 0.16%. Iron and silicon impurity elements are preferably controlled to not exceed about 0.07 or 0.08%, preferably up to about 0.06%, more preferably about 0.05 maximum wt. % each. As used herein, unless indicated otherwise, the expression "consisting essentially of" or "incidental elements" is intended to allow for adding further elements that may even enhance the manufacture or performance of the invention so long as such additions do not cause the resultant alloy product to materially depart from the invention as described herein and provided that such does not embrace prior art. For instance, elements such as silver or hafnium or vanadium may be added to possibly enhance or alter the invention without departing from the scope hereof.

Further, it is preferred that the combined total volume percent of insoluble and soluble constituents is kept relatively low, for instance not over 1.5 vol. %, preferably not over 1 vol. %. Use of relatively high preheat or homogenization and solution heat treat temperatures considering the alloy content aid in this respect, although high temperatures can advise caution to avoid partial melting. Such cautions can include careful heat-up including slow or step-type heating, or both.

In accordance with the invention, the invention alloy is preferably made into a product, suitably an ingot derived product, suitable for hot rolling. For instance, large ingots can be semicontinuously cast of the aforesaid composition and then can be scalped or machined to remove surface imperfections as needed or required to provide a good rolling surface. It is possible to cast an ingot of such quality surface that scalping or machining is not required, but in many cases it is preferred and recommended to scalp the ingot for hot rolling. The ingot may then be preheated to homogenize and solutionize its interior structure and a suitable preheat treatment is to heat to a relatively high temperature for this type of composition, such as 900° F. In doing so, it is preferred to heat to a first lesser temperature level such as heating above 800° F., for instance about 820° F. or above, or 850° F. or above, preferably 860° F. or more, for instance around 870° F. or more, and hold the ingot at about that temperature or temperatures for a significant time, for instance, 3 or 4 hours. Next the ingot is heated the rest of the way up to a temperature of around 890° F. or 900° F. or possibly more for another hold time of a few hours. It is preferred that homogenizing be conducted at cumulative hold times in the neighborhood of 4 to 20 hours or more, the homogenizing temperatures referring to temperatures above 820° F. That is, the cumulative hold time at temperatures above 820° F. should be at least 4 hours and preferably more, for instance 8 to 20 or 24 hours.

The ingot is then hot rolled and it is desirable to achieve an unrecrystallized grain structure in the rolled plate product. Hence, the ingot for hot rolling can exit the furnace at a temperature substantially above 850° F., for instance around 870° or 875° F. or possibly more, and the rolling operation is carried out at temperatures above 775° F., or better yet, above 800° F., for instance around 810° or 825° F. This increases the likelihood of avoiding recrystallization and it is also preferred in some situations to conduct the rolling without a reheating operation by using the power of the rolling mill and heat conservation during rolling to maintain the rolling temperature above a desired minimum, such as 750° F. or so. Hot rolling is continued, normally in a reversing hot rolling mill, until the desired thickness of the plate is achieved. In accordance with the invention, the desired thicknesses for the hot rolled plate for lower wing skin metal are generally within around from about 0.35 or 0.4 or 0.45 or 0.5 to about 1.9 or 2 or 2.2 inches, preferably within around 0.9 or 1 to about 2 or 2.1 inches. Plate intended to be machined into integral spars such as 140 can range from about 1 or 2 inches to about 8 or 9 inches or possibly more. This plate typically can range from around 2 to 4 inches thick for relatively smaller aircraft similar in size to Boeing 737, up to thicker plate of 4 or 5 inches to 8 inches or so thick. In addition to the preferred embodiments of the invention applied to lower wing skin and integral spars, other applications can include forgings and extrusions. In making extrusion, the invention alloy is extruded within around 600° to 750° F., for instance, at around 700° F., and preferably includes a reduction in cross-sectional area (extrusion ratio) of about 10:1. Forging can be used for parts such as wheels.

The hot rolled plate or other wrought product is solution heat treated (SHT) by heating to one or more temperatures within around 840° or 850° F. to about 880° or 900° F. to take substantial portions, preferably all or substantially all, of the soluble zinc, magnesium and copper into solution, it being again understood that with physical processes which are not always perfect, probably every last vestige of these main alloying ingredients may not be fully dissolved during the SHT (solutionizing). After heating to the elevated temperature as just described, the product should be rapidly cooled or quenched to complete the solution heat treating procedure. Such cooling is typically accomplished preferably either by immersion in a suitably sized tank of cold water or by water sprays, although air chilling might be usable as supplementary or substitute cooling means for some cooling. After quenching, certain products may need to be cold worked, such as by stretching, so as to relieve internal stresses or straighten the product, even possibly in some cases, to further strengthen the plate product. For instance, the plate may be stretched 1 or 1½ or possibly 2% or 3% or more, or otherwise cold worked a generally equivalent amount. A solution heat treated (and quenched) product, with or without cold working, is then considered to be in a precipitation-hardenable condition, or ready for artificial aging according to preferred artificial aging methods as herein described or other artificial aging techniques. As used herein, the term "solution heat treat", unless indicated otherwise, shall be meant to include quenching.

After rapidly quenching, and cold working if desired, the plate product is artificially aged by heating to an appropriate temperature to improve strength and other properties. In one preferred thermal aging treatment, the precipitation hardenable plate alloy product is subjected to two main aging steps, phases or treatments, although clear lines of demarcation may not exist between each step or phase. It is generally known that ramping up to and/or down from a given or target treatment temperature, in itself, can produce precipitation (aging) effects which can, and often need to be, taken into account by integrating such ramping conditions and their precipitation hardening effects into the total aging treatment. Such integration was described in greater detail in U.S. Pat. No. 3,645,804 to Ponchel, the disclosure of which is fully incorporated by reference herein. With ramping and its corresponding integration, two or three phases for thermally treating the plate product according to the aging practice may be effected in a single, programmable furnace. For convenience purposes, however, each stage (step or phase) will be more fully described as a distinct operation hereafter. It is believed that the first stage (lower temperature) serves to precipitation harden the alloy product and the second (higher temperature) stage uses one or more elevated temperatures for increasing the resistance to corrosion, such as exfoliation or stress corrosion cracking, and can still further strengthen the alloy. In a second preferred artificial aging treatment, a three-stage or step treatment can be employed wherein following the second higher temperature treatment a third treatment at one or more temperatures lower than the higher temperatures used in the second treatment are employed, and this stage can further increase the strength or other properties of the product. When three artificial aging phases are used, it is usually preferred to control the time for the second (higher) temperature phase so as to allow for further strengthening or beneficiation during the third or lower temperature treatment phase. The three-stage or phase temperature treatments are described in more detail in the aforesaid U.S. Pat. Nos. 4,863,528, 4,832,758, 4,477,292 and 5,108,520, fully incorporated by reference as indicated above. Still another artificial aging treatment could use a single principal aging stage such as heating to within about 270° or 280° F. to around 300° or 310° F.

In some cases, two or three aging phases can be preferred. Some useful artificial aging treatments for practice of the invention include the following:

250° F. for 4 hrs+325° F. for 4 hrs;
250° F. for 24 hrs+325° F. for 10 hrs;
275° F. for 3 hrs+335° F. for 16 hrs.

In general, a two-stage artificial aging treatment would include a first stage at temperatures of from about 175° to 300° or less, preferably around 225° to 275° F. or 280° F., for an amount of time generally inverse to the temperature and ranging from about 1 or 2 hours for 300° F. and 30 or more hours for temperatures around 200° F. or less. A preferred treatment is at about 225° or 230° F. to about 260° or 270° F. or possibly 275° F. for around 30 to 3 or 4 hours. A convenient treatment for this condition is 250° F. for 4 to 30 hours, preferably 8 to 24 hours. For a second higher temperature treatment, the temperature can range from about 300° F. or a little more to about 350° F. or perhaps a little higher to about 360° or 370° F. or even still higher to temperatures of about 400° F., although temperatures in the range of about 320° to about 350° F. are preferred from the standpoint of controlling the process, with temperatures in the range of about 320° or 325° F. to about 335° or 350° F. being more preferred.

Age forming promises a lower manufacturing cost while allowing more complex wing shapes to be formed. During age forming, the part is constrained in a die at an elevated temperature usually between about 250° F. and about 400° F. for several to tens of hours, and desired contours are accomplished through stress relaxation. Especially during a higher temperature artificial aging treatment, such as a treatment above 320° F., the metal can be formed or deformed into a desired shape. In general, the deformations envisioned are relatively simple such as including a very mild curvature across the width of a plate member (such as wing skin members 18 or 16 in FIG. 1) together with a mild curvature along the length of a plate such as 18 as is generally illustrated in somewhat exaggerated form in FIG. 2 which shows a curvature along the length of the upper and lower wing surfaces. It can be desirable to achieve the formation of these mild curvature conditions during the artificial aging treatment, especially during the higher temperature artificial aging temperature. In general, the plate material is heated within around 300° to 400° F., for instance around 330° F., and typically can be placed upon a convex form and loaded by clamping or load application at opposite edges of the plate. The plate more or less assumes the contour of the form over a relatively brief period of time but upon cooling springs back a little when the force or load is removed. The expected springback is compensated for in designing the curvature or contour of the form which is slightly exaggerated with respect to the desired forming of the plate to compensate for springback. An artificial aging treatment step or procedure such as a low temperature aging at around 250° F. can follow age forming, if desired, or the age forming can be performed at a temperature such as 250° F. following aging at a higher temperature such as 330° F. Either before or after this age forming treatment, the plate member can be machined, for instance, such as by tapering the plate such that the portion intended to be closer to the fuselage is thicker and the portion closest to the wing tip is thinner. Additional machining or other shaping operations, if desired, can also be performed either before or after this age forming treatment. The high capacity aircraft may require a relatively thicker plate and a higher level of forming than previously used on a large scale.

The lower wing cover material for the last few generations of modern commercial jetliners has been generally from the 2X24 alloy family in the naturally aged tempers such as T351 or T39. One presently employed product is 2324-T39. In using these alloys, the thermal exposure during age forming needs to be minimized in order to retain the desirable material characteristics of the naturally aged tempers. The invention alloy is preferably in the artificially aged tempers, such as T6-type tempers or preferably T7-type tempers, such as T7651 or T7751. As such, the artificial aging treatment can be simultaneously accomplished during age forming without causing any degradation to its desirable properties.

Furthermore, the ability of the invention alloy to accomplish desired contours during age forming is either equal to or better than the currently used 2X24 alloys. This is illustrated by the results of an age formability response comparison test, which are presented in FIG. 4 which shows a plot of part radius against tool radius.

Figure 4:
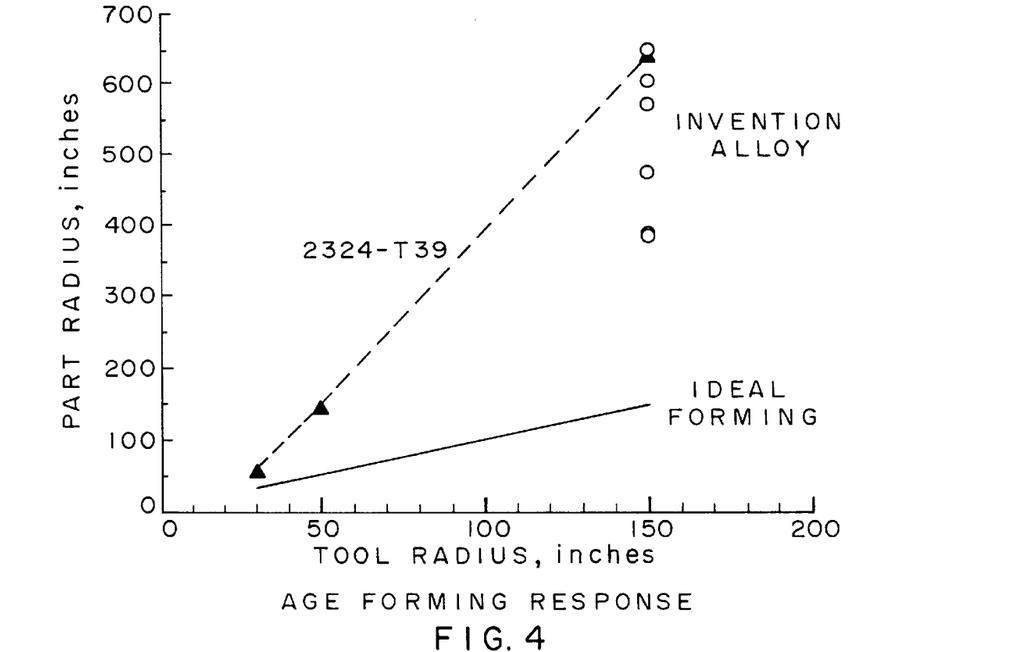
FIG. 4 is a graph showing age forming response (part radius versus tool radius) for the invention and 2324-T39.

If the age formed part conforms exactly to the shape of the die after the age forming cycle, i.e., if there is no "springback", the part radius would be equal to the tool radius. This condition is illustrated in FIG. 4 by the solid line in the plot labeled as "ideal forming". Practically, there will normally be some finite amount of springback. The dashed line with filled triangles represents the age forming response of the 2324-T39 alloy showing the effect of springback. Plate of 2324-T39 is commercially used for lower wing skins and is recognized as a good basis of comparison. The 2324-T39 alloy was tested under a given set of conditions to minimize the effects of thermal exposure on its final material properties so as to preserve the desired characteristics of the T39 temper for this alloy, but this inherently adversely affects age forming. The invention alloy age formed during artificial aging treatments to produce the T7-type tempers is represented by the open circles. It shows equal or less springback, and therefore, better age formability than 2324-T39 for the limited conditions evaluated, and is capable of achieving the desired material properties.

Conforming to the above-identified limitations, including composition and correct processing enhances the production of plate stock having high yield strength together with very good levels of room temperature (RT) and cold temperature (CT) fracture toughness, as well as very good resistance to corrosion. The strength of plate produced in accordance with the invention is highly useful for lower wing skins. The longitudinal ultimate or tensile strength for sheet and thin plate (not over about 2½ inches thick) is typically around 80 to 84 ksi or more, and the minimum longitudinal ultimate or tensile strength can be specified at about 74, preferably 78, or more preferably 82 ksi in stronger tempers. The typical long transverse ultimate strength is around 79 to 83 ksi or more, and a minimum long transverse ultimate or tensile strength can be about 73 or 77 or more, or more preferably 80 or 81 ksi. The tension yield strength in the longitudinal direction is typically around 73 or 74 to 78 or 80 ksi and minimum longitudinal tension yield strength levels can be about 66 or 67 or 71 ksi, or more preferably 75 ksi. Long transverse tension yield strength is typically about 73 or 75 ksi and minimum long transverse tension yield strength levels can be about 65 or 66 or 70 ksi, more preferably 73 or 74 ksi in stronger tempers.

The different tempers resulting from different artificial aging treatments will impart different levels of strength and other performance characteristics, especially corrosion related properties, including stress corrosion cracking. T6 temper material which is aged at or around the so-called peak strength of an alloy exhibits high strength but can also exhibit corrosion resistance, including stress corrosion cracking resistance levels of less than some other tempers. T76 temper is often produced by artificially aging beyond a T6 level (relatively slight averaging) to produce a strength level that while less than T6 is somewhat comparable thereto, but T76 material has somewhat better corrosion resistance than T6-type tempers. T77 temper can be produced by the three-stage or three-phase treatments described earlier and has a strength level equivalent to or greater than T76 temper. T74 temper is artificially aged more than T76 or T77 and has a lower strength level but increased resistance to stress corrosion cracking. Hence, when talking about minimum strength levels, it is important to bear in mind that the temper influences the strength of a particular product in that overaged tempers typically have less strength than peak strength aged tempers but tend to compensate for the strength loss by having better corrosion resistance. In general, a T76 material will have a decrease from a T6 temper material of about 5% in strength, whereas a T74 or T73 material will respectively reflect decreases of about 7 and 10% from the T6 or peak strength condition. This is just a general guide and is not necessarily intended to be precise or definitive. Another aspect affecting strength is the thickness of the material in that as a general matter thicker material suffers a decrease in strength and toughness in comparison with a thinner material. For instance, comparing a plate of about 1.2 inches versus a plate of about 5 inches may show a 4 ksi reduction in yield strength for the 5-inch plate and some toughness reduction such as about 5 ksi$\sqrt{}$inch.

When referring to a minimum (for instance, for strength or toughness), such can refer to a level at which specifications for purchasing or designating materials can be written or a level at which a material can be guaranteed or a level that an airframe builder (subject to safety factor) can rely on in design. In some cases, it can have a statistical basis wherein 99% of the product conforms or is expected to conform with 95% confidence using standard statistical methods.

Fracture toughness is an important property to airframe designers, particularly if good toughness can be combined with good strength. By way of comparison, the tensile strength, or ability to sustain load without fracturing, of a structural component under a tensile load can be defined as the load divided by the area of the smallest section of the component perpendicular to the tensile load (net section stress). For a simple, straight-sided structure, the strength of the section is readily related to the breaking or tensile strength of a smooth tensile coupon. This is how tension testing is done. However, for a structure containing a crack or crack-like defect, the strength of a structural component depends on the length of the crack, the geometry of the structural component, and a property of the material known as the fracture toughness. Fracture toughness can be thought of as the resistance of a material to the harmful or even catastrophic propagation of a crack under a load.

Fracture toughness can be measured in several ways. One way is to load in tension a test coupon containing a crack. The load required to fracture the test coupon divided by its net section area (the cross-sectional area less the area containing the crack) is known as the residual strength with units of thousands of pounds force per unit area (ksi). When the strength of the material as well as the specimen geometry are constant, the residual strength is a measure of the fracture toughness of the material. Because it is so dependent on strength and specimen geometry, residual strength is usually used as a measure of fracture toughness when other methods are not as useful as desired because of some constraint like size or shape of the available material.

When the geometry of a structural component is such that it does not deform plastically through the thickness when a tension load is applied (plane-strain deformation), fracture toughness is often measured as plane-strain fracture toughness, $K_{Ic}$. This normally applies to relatively thick products or sections, for instance 0.6 or preferably 0.8 or 1 inch or more. The ASTM has established a standard test using a fatigue pre-cracked compact tension specimen to measure $K_{Ic}$ which has the units ksi$\sqrt{}$in. This test is usually used to measure fracture toughness when the material is thick because it is believed to be independent of specimen geometry as long as appropriate standards for width, crack length and thickness are met. The symbol K, as used in $K_{Ic}$, is referred to as the stress intensity factor.

Structural components which deform by plane-strain are relatively thick as indicated above. Thinner structural components (less than 0.8 to 1 inch thick) usually deform under plane stress or more usually under a mixed mode condition. Measuring fracture toughness under this condition can introduce variables because the number which results from the test depends to some extent on the geometry of the test coupon. One test method is to apply a continuously increasing load to a rectangular test coupon containing a crack. A plot of stress intensity versus crack extension known as an R-curve (crack resistance curve) can be obtained this way. The load at a particular amount of crack extension based on a 25% secant offset in the load vs. crack extension curve and the effective crack length at that load are used to calculate a measure of fracture toughness known as $K_{R25}$. At a 20% secant, it is known as $K_{R20}$. It also has the units of ksi$\sqrt{}$in. ASTM E561 (incorporated in its entirety herein by reference) concerns R-curve determination, and such is generally recognized in the art.

When the geometry of the alloy product or structural component is such that it permits deformation plastically through its thickness when a tension load is applied, fracture toughness is often measured as plane-stress fracture toughness which can be determined from a center cracked tension test. The fracture toughness measure uses the maximum load generated on a relatively thin, wide pre-cracked specimen. When the crack length at the maximum load is used to calculate the stress-intensity factor at that load, the stress-intensity factor is referred to as plane-stress fracture toughness $K_c$. When the stress-intensity factor is calculated using the crack length before the load is applied, however, the result of the calculation is known as the apparent fracture toughness, $K_{app}$, of the material. Because the crack length in the calculation of $K_c$ is usually longer, values for $K_c$ are usually higher than $K_{app}$ for a given material. Both of these measures of fracture toughness are expressed in the units ksi$\sqrt{}$in. For tough materials, the numerical values generated by such tests generally increase as the width of the specimen increases or its thickness decreases as is recognized in the art. Unless indicated otherwise herein, plane stress ($K_c$) values referred to herein refer to 16-inch wide test panels. Those skilled in the art recognize that test results can vary depending on the test panel width, and it is intended to encompass all such tests in referring to toughness. Hence, toughness substantially equivalent to or substantially corresponding to a minimum value for $K_c$ or $K_{app}$ in characterizing the invention products, while largely referring to a test with a 16-inch panel, is intended to embrace variations in $K_c$ or $K_{app}$ encountered in using different width panels as those skilled in the art will appreciate.

The temperature at which the toughness is measured can be significant. In high altitude flights, the temperature encountered is quite low, for instance, minus 65° F., and for newer commercial jet aircraft projects, toughness at minus 65° F. is a significant factor, it being desired that the lower wing material exhibit a toughness $K_{Ic}$ level of around 45 ksi$\sqrt{}$in at minus 65° F. or, in terms of $K_{R20}$, a level of 95 ksi$\sqrt{}$in, preferably 100 ksi$\sqrt{}$in or more.

The toughness of the improved products according to the invention is very high and in some cases may allow the aircraft designer's focus for a material's durability and damage tolerance to emphasize fatigue resistance as well as notch toughness measurement. Resistance to cracking by fatigue is a very desirable property. The fatigue cracking referred to occurs as a result of repeated loading and unloading cycles, or cycling between a high and a low load such as when a wing moves up and down. This cycling in load can occur during flight due to gusts or other sudden changes in air pressure, or on the ground while the aircraft is taxing. Fatigue failures account for a large percentage of failures in aircraft components. These failures are insidious because they can occur under normal operating conditions without excessive overloads, and without warning. Crack evolution is accelerated because material inhomogeneities act as sites for initiation or facilitate linking of smaller cracks. Therefore, process or compositional changes which improve metal quality by reducing the severity or number of harmful inhomogeneities improve fatigue durability.

Figure 5:
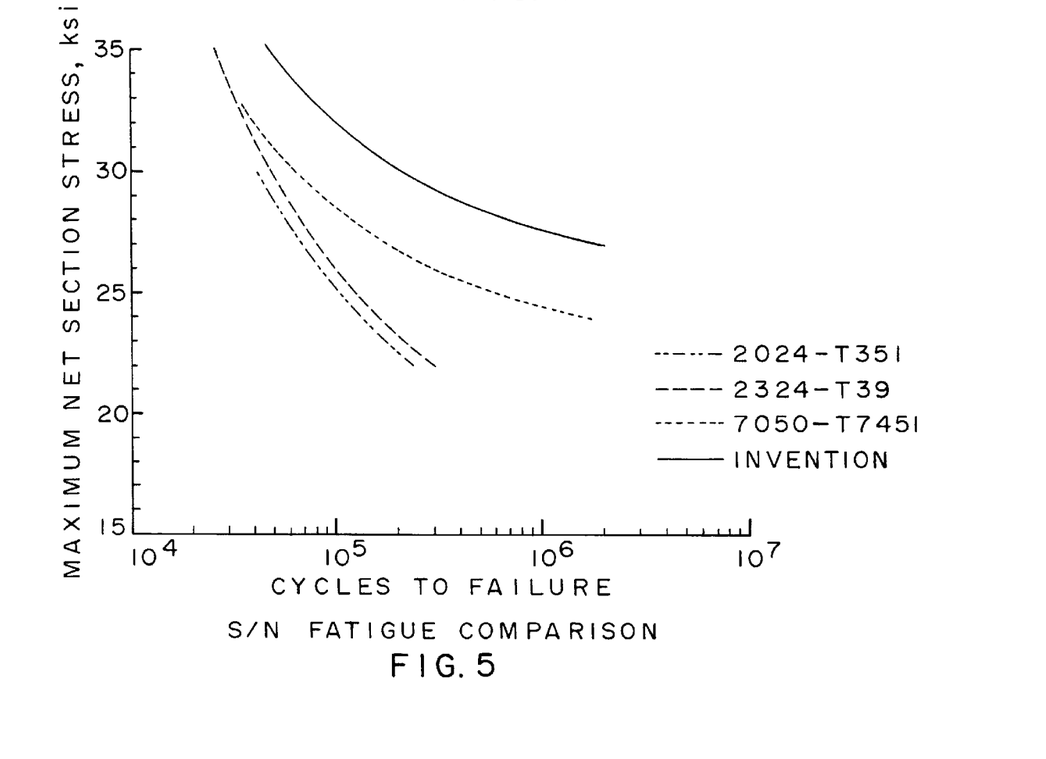
FIG. 5 is a graph showing fatigue comparison (double open hole fatigue test).

Stress life (S-N or S/N) fatigue tests characterize a material resistance to fatigue initiation and small crack growth which comprises a major portion of total fatigue life. Hence, improvements in S-N fatigue properties may enable a component to operate at higher stresses over its design life or operate at the same stress with increased lifetime. The former can translate into significant weight savings by downsizing, or manufacturing cost saving by component or structural simplification, while the latter can translate into fewer inspections and lower support costs. The loads during fatigue are below the static ultimate or tensile strength of the material measured in a tensile test and they are typically below the yield strength of the material. The fatigue initiation fatigue test is an important indicator for a buried or hidden structural member such as a wing spar which is not readily accessible for visual or other examination to look for cracks or crack starts. In this type of S-N fatigue testing at a net stress concentration factor $K_t$ of 2.5 using double open hole specimens (about 9 inches long by 1 inch wide by ⅛ inch thick with two holes 0.187 inch diameter along the length pulled axially) with a minimum/maximum stress ratio R of 0.1, the invention demonstrates a marked improvement over 2024-T351, 2324-T39 and 7050-T7451, as shown in FIG. 5 which is an S-N fatigue comparison. FIG. 5 shows that for a given stress level the invention allows for many more cycles and that for a desired number of cycles the invention allows for a higher stress than the other products shown.

If a crack or crack-like defect exists in a structure, repeated cyclic or fatigue loading can cause the crack to grow. This is referred to as fatigue crack propagation. Propagation of a crack by fatigue may lead to a crack large enough to propagate catastrophically when the combination of crack size and loads are sufficient to exceed the material's fracture toughness. Thus, performance in the resistance of a material to crack propagation by fatigue offers substantial benefits to aerostructure longevity. The slower a crack propagates, the better. A rapidly propagating crack in an airplane structural member can lead to catastrophic failure without adequate time for detection, whereas a slowly propagating crack allows time for detection and corrective action or repair. Hence, a low fatigue crack growth rate is a desirable property.

The rate at which a crack in a material propagates during cyclic loading is influenced by the length of the crack. Another important factor is the difference between the maximum and the minimum loads between which the structure is cycled. One measurement including the effects of crack length and the difference between maximum and minimum loads is called the cyclic stress intensity factor range or $\Delta K$, having units of ksi$\sqrt{}$in, similar to the stress intensity factor used to measure fracture toughness. The stress intensity factor range ($\Delta K$) is the difference between the stress intensity factors at the maximum and minimum loads. Another measure affecting fatigue crack propagation is the ratio between the minimum and the maximum loads during cycling, and this is called the stress ratio and is denoted by R, a ratio of 0.1 meaning that the maximum load is 10 times the minimum load. The stress, or load, ratio may be positive or negative or zero. Fatigue crack growth rate testing is typically done in accordance with ASTM E647-88 (and others) well known in the art, the entire content of all being incorporated herein by reference.

Figure 6:
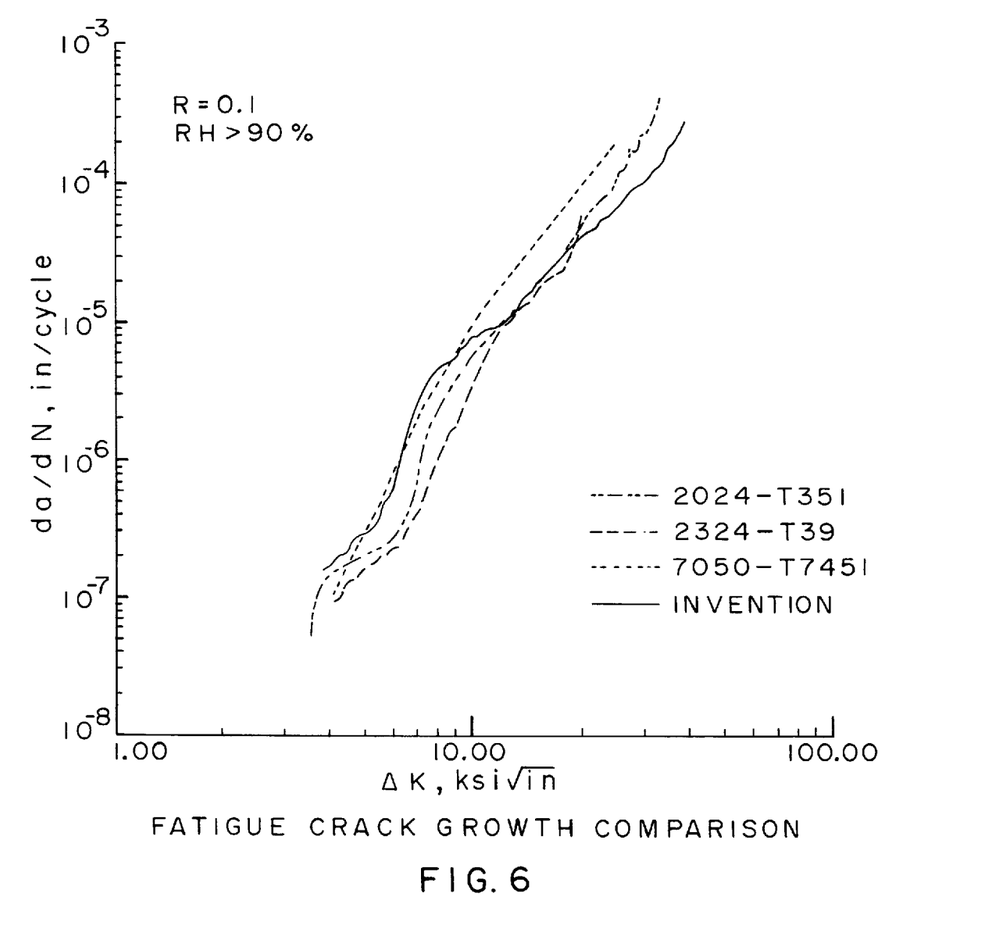
FIG. 6 is a graph showing fatigue crack growth rate comparison.

The fatigue crack propagation rate can be measured for a material using a test coupon containing a crack. One such test specimen or coupon is about 12 inches long by 4 inches wide having a notch in its center extending in a cross-wise direction (across the width; normal to the length). The notch is about 0.032 inch wide and about 0.2 inch long including a 60° bevel at each end of the slot. The test coupon is subjected to cyclic loading and the crack grows at the end(s) of the notch. After the crack reaches a predetermined length, the length of the crack is measured periodically. The crack growth rate can be calculated for a given increment of crack extension by dividing the change in crack length (called $\Delta a$) by the number of loading cycles ($\Delta N$) which resulted in that amount of crack growth. The crack propagation rate is represented by $\Delta a/\Delta N$ or 'da/dN' and has units of inches/cycle. The fatigue crack propagation rates of a material can be determined from a center cracked tension panel. In a comparison using R=0.1 tested at a relative humidity over 90% with $\Delta K$ ranging from around 4 to 20 or 30, the invention material exhibited relatively good resistance to fatigue crack growth, similar to 2024-T351, 2324-T39 and 7050-T7451, as shown in FIG. 6. However, the superior performance in S-N fatigue shown in FIG. 5 makes the invention material much better suited for a buried or hidden member such as a wing spar.

The invention products exhibit very good corrosion resistance in addition to the very good strength and toughness and damage tolerance performance.

The exfoliation corrosion resistance for products in accordance with the invention can be EC or better ("or better" meaning EB or EA or N, that is, better performance in the test) in the EXCO test, typically EB or better, for test specimens taken at either mid-thickness (T/2) or one-tenth of the thickness from the surface (T/10) (T is thickness) or both. EXCO testing is known in the art and is described in ASTM G34, incorporated fully herein by reference. An EXCO rating of "EC" is considered good corrosion resistance in that it is considered acceptable for some commercial aircraft; "EB" is still better.

Stress corrosion cracking resistance across the short transverse direction is often considered an important property especially in relatively thick members. The stress corrosion cracking resistance for products in accordance with the invention in the short transverse direction can be equivalent to that needed to pass a C-ring or $\frac{1}{8}$-inch round bar alternate immersion test for 20 days at 25 or 30 ksi or more, using test procedures in accordance with ASTM G47 (including ASTM G44 and G38 for C-ring specimens and G49 for $\frac{1}{8}$-inch bars), said ASTM G47, G44, G49 and G38 all known in the art and being incorporated herein by reference.

As a general indicator of exfoliation corrosion and stress corrosion resistance, the plate typically can have an electrical conductivity of 35 or 40, or preferably 40% or more of the International Annealed Copper Standard (IACS).

Thus, the good exfoliation corrosion resistance of the invention is evidenced by an EXCO rating of "EC" or better, but in some cases other measures of corrosion resistance may be specified or required by airframe builders, such as stress corrosion cracking resistance or electrical conductivity. Satisfying any one or more of these specific ations is considered good corrosion resistance.

Table 1 below lists minimum property levels for different product forms of the invention. UTS refers to ultimate or tensile strength; YS is yield strength; and K refers to toughness. S/N refers to fatigue performance. SCC is stress corrosion cracking stress. In general, but not necessarily in limitation, especially for thick plate, the lower values for strength can correspond more to lower strength tempers such as T74 (especially for plate) whereas higher minimum strength can correspond more to stronger tempers such as T77 or T6 type tempers, although higher levels are also generally more preferred than lower levels for any temper. In the case of toughness and fatigue, higher numbers generally simply designate preferred levels, although in any specific product a higher strength level can be accompanied by a lower toughness level than a lower strength product. In Table 1, property direction is in accordance with convention (e.g. L=longitudinal; LT=long transverse, and so on). Fracture toughness is tested at both 75° F. and minus 65° F. In referring to room temperature (RT), such encompasses temperatures associated with ordinary room temperature (for example, temperatures such as around 70° F. to 80° F., typically around 75° F.).

TABLE 1

| | | Minimum Property Levels | | | | | |
|---|---|---|---|---|---|---|---|
| | Sheet | Thin Plate <2.5" | Thick Plate 2.5–6" | Really Thick Plate >6" | Extrusions | Die Forging | Hand Forging |
| UTS, ksi | | | | | | | |
| L | 73, 77, 81 | 74, 78, 82 | 69, 74, 79 | 66, 70, 74 | 75, 79, 83 | 70, 74, 78 | 68, 72, 76 |
| LT | 73, 77, 81 | 73, 77, 81 | 68, 73, 78 | 65, 69, 73 | 73, 77, 81 | | 66, 70, 74 |
| ST | | | 60, 66, 72 | 59, 63, 67 | | 65, 69, 73 | 59, 63, 67 |
| YS, ksi | | | | | | | |
| L | 68, 72, 76 | 67, 71, 75 | 63, 68, 73 | 60, 64, 68 | 69, 73, 77 | 61, 65, 69 | 62, 66, 70 |
| LT | 68, 72, 76 | 66, 70, 74 | 62, 67, 72 | 59, 63, 67 | 67, 71, 75 | | 59, 63, 67 |
| ST | | | 57, 61, 65 | 54, 58, 62 | | 54, 58, 62 | 54, 58, 62 |
| Elong, % | | | | | | | |
| L | 7, 8, 9 | 8, 9, 10 | 8, 9, 10 | 6, 7, 8 | 6, 7, 8 | | 9, 10, 11 |
| LT | 6, 7, 8 | | 7 | 6 | | | 4 |
| ST | | | 1.5 | 1 | | | 3 |
| $K_{Ic}$, ksi√in | | | | | | | |
| L-T, 75° | | 39, 42, 45 | 31, 34, 37 | 23, 26, 29 | 42, 45, 48 | 31, 34, 37 | 31, 34, 37 |
| L-T, −65° | | 34, 37, 40 | 26, 29, 32 | 18, 21, 24 | 37, 40, 43 | 26, 29, 32 | 26, 29, 32 |

TABLE 1-continued

Minimum Property Levels

|  | Sheet | Thin Plate <2.5" | Thick Plate 2.5–6" | Really Thick Plate >6" | Extrusions | Die Forging | Hand Forging |
|---|---|---|---|---|---|---|---|
| T-L, 75° |  | 30, 33, 36 | 24, 27, 30 | 17, 20, 23 | 29, 32, 35 | 20, 23, 26 | 24, 27, 30 |
| T-L, −65° |  | 27, 30, 33 | 21, 24, 27 | 14, 17, 20 | 26, 29, 32 | 17, 20, 23 | 21, 24, 27 |
| $K_c$, ksi√in |  |  |  |  |  |  |  |
| L-T, 75° | 120, 145, 170 | 125, 150, 175 |  |  |  |  |  |
| L-T, −65° | 115, 135, 160 | 115, 140, 165 |  |  |  |  |  |
| T-L, 75° | 95, 120, 145 | 75, 100, 125 |  |  |  |  |  |
| T-L, −65° | 90, 115, 135 | 65, 90, 115 |  |  |  |  |  |
| S/N, $K_t$ = 2.5 |  |  |  |  |  |  |  |
| S at N = $10^5$ | 28, 30, 32 | 28, 30, 32 | 26, 28, 30 | 20, 22, 24 | 28, 30, 32 | 28, 30, 32 | 28, 30, 32 |

The invention has been described in terms of plate which is preferred, but it is believed that other product forms may be able to enjoy the benefits of the invention and Table 1 refers to minimum property levels for extrusions and forgings.

To this point, the emphasis has been on rolled plate products for the wing skin of a large airplane, a wing skin being typically ¼ to 1½ inches thick from one end to another, the production of which would start with an aluminum alloy plate having a length of 100 to 150 feet, a width of 80 to 120 inches, and a thickness of about ¾ to 1¾ inches. It can be seen (referring again to FIG. 1) that the wing lower skin can be stiffened by stiffener-type stringers which can be J-shaped, such as stringer 25, or Z- or S-shaped, like stringer 30, or it can be a hat-shaped channel, such as 26 shown in FIG. 1 for the upper wing skin, or any other shape that can be attached to the wing skin 18 and reinforce its stiffness while not adding a lot of weight. While in some cases it is preferred for manufacturing economies to separately fasten stringers such as those shown in FIG. 1, such can be machined from a much thicker plate by the removal of the metal between the stiffener geometries, leaving only the stiffener shapes integral with the main wing skin thickness 18, thus eliminating all the rivets. Also the invention has been described in terms of thick plate for machining wing spar members as explained above, the spar member generally corresponding in length to the wing skin material.

Example 1

Ingots about 16 inches by 50 inches in cross section having the following compositions were cast:

TABLE 2

Compositions

| Alloy | Si (%) | Fe (%) | Cu (%) | Mg (%) | Cr (%) | Zn (%) | Zr (%) |
|---|---|---|---|---|---|---|---|
| Alloy A (Invention) | 0.03 | 0.03 | 1.96 | 1.72 | — | 6.37 | 0.11 |
| Alloy B | 0.04 | 0.03 | 1.97 | 2.48 | — | 6.58 | 0.11 |
| 7050 | 0.12 | 0.15 | 2.2 | 2.2 | 0.04 | 6.1 | within 0.08–0.15 |

The ingots were scalped for hot rolling and then preheated to homogenize the metal and prepare it for hot rolling. The homogenization included heating to about 880° F. for a little over 4 hours followed by slowly heating up to a temperature of about 900° F. holding at 900° F. for a little over 24 hours. The plate was hot rolled at relatively high temperatures to produce plate about 1.2 inches thick. The high rolling temperatures favor an unrecrystallized condition in the plate after subsequent heat treatment. During plastic deformation, such as rolling, some energy is stored in the deformed metal. Nucleation and growth of new grains may take place during the hot rolling process or during subsequent annealing (or during solution heat treating) at the expense of the deformed matrix. These nuclei are strain-free and are completely or partially surrounded by high-angle grain boundaries. They can grow by the migration of their boundaries into the deformed matrix. If they consume the deformed matrix completely, the metal is said to have been 100% recrystallized, and the grain boundaries in the product usually possess high angle characteristics. On the other hand, if the growth of the new grains is completely inhibited during annealing, the material is said to be 100% unrecrystallized.

By "unrecrystallized" used herein, such means that the plate is preferably 85 to 100% unrecrystallized, or at least 60% of the entire thickness of the plate product is unrecrystallized.

The desirable "unrecrystallized" grain structure is promoted by minimizing the stored energy of deformation through use of high hot rolling temperature, preferably above 775° F. or 800° F. Further, the homogenization treatment described earlier also is designed to cause the precipitation of a fine distribution of dispersoids of $ZrAl_3$. These dispersoids pin the migrating grain boundaries during annealing or solution heat treating, and help promote an unrecrystallized grain structure. The plate is then solution heat treated to about 900° F. for about one hour, after which the hot plate is immersed in cold water quenching. The plate was stretched approximately 2% to relieve internal stress and quench distortion and then artificially aged. The artificial aging treatments employed and the properties measured are indicated in Table 3 below where the superiority of the invention in toughness and strength-toughness property combination along with notched (double open hole) fatigue performance is readily apparent.

TABLE 3

| | Properties | | | |
|---|---|---|---|---|
| | Alloy A | Alloy B | | |
| Composition Age Treatment | 24h/250° + 10h/325° | 24h/250° + 10h/325° | 24h/250° + 20h/325° | 7050 T7651 |
| Strength L orientation | | | | |
| YS, ksi | 76.2 | 82.3 | 73.8 | 70 |
| UTS, ksi | 82.1 | 88.5 | 81.8 | 78 |
| Elong, % | 13.6 | 11.8 | 14.0 | — |
| Strength LT orientation | | | | |
| YS, ksi | 75.4 | 82.1 | | 69 |
| UTS, ksi | 81.4 | 88.6 | | 78 |
| Elong, % | 13.0 | 11.0 | | — |
| Toughness KIc, ksi√in | | | | |
| L-T at 75° F. | 47.5 | 26.2 | 33.3 | 31 |
| L-T at –65° F. | 42.0 | | 26.9 | |
| T-L at 75° F. | 40.7 | 24.0 | | 28 |
| Toughness Kc, ksi√in | | | | |
| L-T at 75° F. | 172.9 | 126.6 | | |
| L-T at –65° F. | 166.4 | 99.3 | | |
| T-L at 75° F. | 123.9 | | | |
| T-L at –65° F. | 79.8 | | | |
| Fatigue S/N, $K_t$ = 2.5 | | | | |
| N at S = 29 ksi | 565,000 | | | 145,708 |
| N at S = 31 ksi | 226,000 | | 88,400 | |
| N at S = 33 ksi | 70,700 | | | |

Figure 7:
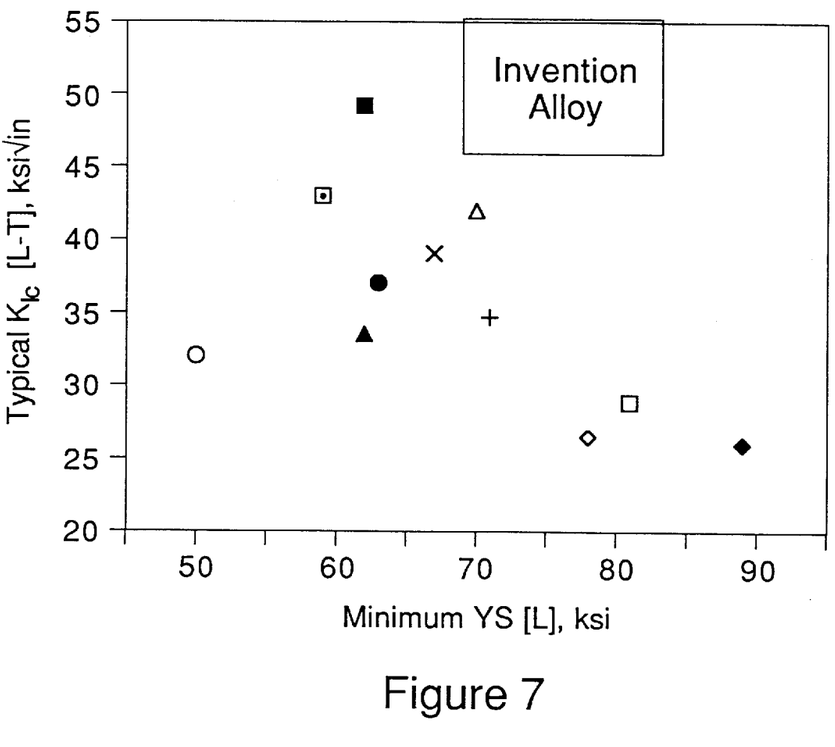
FIG. 7 is a graph comparing typical toughness and minimum yield strength characteristics of the invention and several plate products.

The invention material is considered superior to several alloy-temper combinations including several currently considered useful in structural parts for commercial jet aircraft. FIG. 7 is a graph showing the performance of the invention plate (one inch thick) in terms of minimum tension yield strength versus typical fracture toughness (L-T direction) $K_{Ic}$ in comparison with several other commercial one-inch thick aluminum plate products. The following Table 4 correlates the point designations in FIG. 7 with the commercial products they designate.

TABLE 4

| Plate Product | Symbols in FIG. 7 |
|---|---|
| 2024-T351 | ○ white circle |
| 2324-T39 | ● black circle |
| 7150-T6151 | □ white square |
| 7150-T7751 | ◊ white diamond |
| 7050-T7451 | X "X" |
| 7050-T7651 | + plus sign |
| 7475-T651 | Δ white triangle |
| 7475-T7651 | ⊡ white square with dot |
| 7475-T7351 | ■ black square |
| 7055-T7751 | ♦ black diamond |
| 7010-T7365 | ▲ black triangle |

The large block for the invention in FIG. 7 is intended to encompass several temper conditions resulting from different artificial aging treatments to produce different combinations of strength and toughness. As can be seen in FIG. 7, the invention is superior in strength-toughness combinations.

In manufacturing the wing for high capacity and other commercial jet aircraft, the plate members used for the upper and lower wing skins are hot rolled, solution heat treated and quenched. The plate is then cut or machined, or both, into a desired shape. Normally, wing skin is tapered to be thicker at the end closer to the fuselage than at the end further away from the fuselage, and that tapering is typically accomplished by machining. There is also often a slight bowing of the wing, as shown in FIG. 2, which can be accomplished by machining or by age forming. The age forming can be carried out after the tapering operation, although it is possible to perform the tapering after an age forming operation which shapes the plate to conform to the desired profile. The plate is then artificially aged to a desired temper. As just stated, there can be some combination of forming and aging in this sequence of operations. The extruded or rolled stringers are then attached to the surfaces of the wing skin, specifically the inside surfaces that are not seen from the outside of the airplane. The stringers may be extruded or rolled or otherwise made into the elongate shapes as generally shown in FIG. 1. If the wing skin plate is bowed, the stringers should also be bowed before joining to the plate. The stringers are affixed to the plate normally by mechanical fasteners, typically rivets. In accordance with the invention, for the lower wing skin, it is preferred that the plate be made from an alloy in accordance with the invention and that the lower wing skin stringers also be made with an alloy in accordance with the invention. The skins for the upper and lower wing box members are then assembled with the end pieces 20 and 40 in FIG. 1 to make a box-like member as shown in FIG. 1. In accordance with a preferred practice of the invention, one or both end members, or spars, are made or shaped, typically by operations comprising machining, from thick plate made in accordance with the invention and fastened to the upper and lower wing skin members, as shown in FIG. 3, right side, to make the wing structure "box". A preferred embodiment includes making the upper wing skin member from an alloy containing about 7.6 to 8.4% zinc, about 1.8 to 2.2% magnesium, about 2.1 to 2.6% copper and one or more of Zr, V or Hf, present up to 0.5%, preferably Zr, and making one or more spar members in accordance with the invention. In this embodiment, the lower wing skin is also preferably in accordance with the invention but could be a quality 2XXX type alloy product if desired. Fuel tank or other provisions can be placed inside the wing member if it is a box-type member as shown in FIG. 1.

It can be of advantage in some cases to clad plate or sheet in accordance with the invention to enhance some corrosion resistance aspects in accordance with principles recognized in the art.

While some emphasis is placed on high capacity airplanes, and wing skins for such, such is simply one preferred application for the invention but not necessarily the only use as it is believed the invention also applies to other commercial airplanes as well.

While the invention has been described largely in connection with wing structural members, such is not necessarily intended to limit the invention which, it is believed, may find application as a relatively thick rolled plate product, for instance, over 2½ inches or over 3 inches thick, for instance, 4 or 5 or 6 inches thick, or even thicker, for machining into the kinds of shapes sometimes made by die forging. Die forging can produce a number of useful shapes but, as is known, die forgings can have residual stresses which complicate subsequent machining operations by introducing distortion during machining. Starting with a thick plate and machining the part or member directly from the thick plate avoids much of this problem because the plate can be stretched after solution heat treatment to relieve many residual internal stress effects. Examples of products that it is believed can be made this way are bulkhead pieces or members, attachment fittings, such as wing attachment fittings, landing gear components, lugs, connections and integrally stiffened panels (panels with integral reinforcing ribs machined or otherwise introduced). Accordingly, it is intended that the invention encompass making such parts and members from rolled plate in accordance with the invention.

Unless indicated otherwise, as used throughout this description of the invention, the following definitions shall apply:

a. The term "ksi" means kilopounds per square inch.
b. The term "minimum strength" or a minimum for another property or a maximum for a property shall mean the level at which 99% of the product is expected to conform with 95% confidence using standard statistical methods.
c. The term "ingot-derived" means solidified from liquid metal by a known or subsequently developed casting processes and includes, but is not limited to, direct chill (DC) continuous casting, electromagnetic continuous (EMC) casting, and variations thereof, as well as truly continuous slab and other casting techniques.
d. The term "7XXX" or "7000 Series" when referring to alloys shall mean structural aluminum alloys containing zinc as their alloying element present in the greatest weight percent as defined by the Aluminum Association.
e. The term "2XXX" or "2000 Series" when referring to alloys shall mean structural aluminum alloys containing copper as their alloying element present in the greatest weight percent as defined by the Aluminum Association.

In stating a numerical range or a minimum or a maximum for an element of a composition or a temperature, time or other process matter or a property or an extent of improvement or any other matter herein, and apart from and in addition to the customary rules for rounding off numbers, such is intended to specifically designate and disclose each number, including each fraction and/or decimal, (i) within and between the stated minimum and maximum for a range, or (ii) at and above a stated minimum, or (iii) at and below a stated maximum. For example, a range of 6 to 6.7% zinc expressly specifically discloses zinc contents of 6.1, 6.2, 6.3% . . . and so on, up to about 6.7% zinc. Similarly, herein disclosing artificial aging to one or more temperatures between about 300° and 400° F. specifically discloses 301°, 302° F., . . . 315°, 316° F., . . . and so on, up to the stated maximum. Designating up to 0.06% or 0.06% maximum discloses 0.01, 0.02 . . . —up to 0.06%.

Having described the presently preferred embodiments, it is to be understood that the invention may be otherwise embodied within the scope of the appended claims.

What is claimed is:

1. A method of producing a lower wing skin structural member for a commercial jet aircraft comprising providing a body of alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% irons, not more than about 0.11% iron plus silicon, the balance aluminum, incidental elements and impurities;

homogenizing said alloy by heating within about 750° to about 890° F. and then further homogenizing by further heating up and further increasing alloy temperature to between about 890° and about 910° F. to provide a homogenized alloy, hot rolling said homogenized alloy at temperatures above 750° F. to provide hot rolled alloy, solution heat treating said hot rolled alloy at a temperature of at least 880° F. to provide a solution beat treated alloy, quenching said solution heat treated alloy to provide a quenched alloy, stretching said quenched alloy at least about 1% to provide a stretched alloy, artificially aging said stretched alloy by heating within about 175° to about 290° F. and heating within about 300° to 350° F.

2. In a method wherein an aluminum alloy plate member is made into a lower wing structural member, comprising skin and stringers fastened to or integral with said skin said method including shaping said plate member, the improvement wherein said plate member comprises an aluminum alloy consisting essentially of about m, incidental elements and impurities, and said stringer members comprise an aluminum alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than bout 0.11% iron plus silicon, the balance aluminum, incidental elements and impurities and said stringer members comprise an aluminum alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than bout 0.11% iron plus silicon, the balance aluminum, incidental elements and impurities.

3. In a method according to claim 2 wherein said stringers are integral with said skin.

4. In a method according to claim 2 wherein said stringers are provided separately from said skin and are attached to said skin.

5. A method of producing a rolled plate for a wing spar structural member for a commercial jet aircraft comprising providing a body of alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements aid impurities;

homogenizing said alloy to provide a homogenized alloy, hot rolling said homogenized alloy to provide a hot rolled alloy, solution heat treating said hot rolled alloy to provide a solution heat treated alloy, quenching said solution heat treated alloy to provide a quenched alloy, artificially aging said quenched alloy.

6. The method according to claim 5 which includes an additional artificial aging heating within about 175° F. to about 290° F. after said aging within about 300° F. to 400° F.

7. In a method wherein a thick aluminum alloy wrought product is made into an artificially aged aluminum alloy wing spar structural member, said method including shaping and artificially aging said wrought product to a shape for said wing structural spar member, the improvement wherein said wrought product comprises an aluminum alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

8. In a method according to claim 7 wherein said wrought product is plate.

9. In a method according to claim 7 wherein said wrought product is a forging.

10. In a method according to claim 7 wherein said wrought product is an extrusion.

11. In a method of producing an artificially aged aluminum alloy structural member for an aircraft, said method including shaping and artificially aging an aluminum alloy product for said structural member, the improvement wherein said product comprises an aluminum alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

12. In the method according to claim 11 wherein said product comprises a plate less than 2½ inches thick and wherein said plate before or after any shaping has after artificial aging an L yield strength of at least 71 ksi, an L-T fracture toughness $K_c$ at RT of at least 130 ksi√in and a minus 65° F. L-T fracture toughness $K_c$ of at least 120 ksi√in.

13. In the method according to claim 11 wherein said product comprises a plate less than 2½ inches thick and wherein said plate before or after any shaping has after artificial aging an L yield strength of at least 70 ksi, an L-T fracture toughness $K_c$ at RT of at least 140 ksi√in and a minus 65° F. L-T fracture toughness $K_c$ of at least 130 ksi√in.

14. In the method according to claim 11 wherein said product comprises a plate 2½ to 4 inches thick and wherein said plate before or after any shaping has after artificial aging an L yield strength of at least 66 ksi, and an L-T fracture toughness $K_{1c}$ at RT of at least 30 ksi√in.

15. In the method according to claim 11 wherein said product comprises a plate less than 2½ inches thick and wherein said plate before or after any shaping has after artificial aging an L yield strength of at least 72 ksi, an L-T fracture toughness $K_{1c}$ at RT of at least 39 ksi√in and a minus 65° F. L-T fracture toughness $K_{1c}$ of at least 34 ksi√in.

16. In the method according to claim 11 wherein said product comprises a plate 2½ to 4 inches thick and wherein said plate before or after any shaping has after artificial aging an L yield strength of at least 63 ksi, and an L-T fracture toughness $K_{1c}$ at RT of at least 34 ksi√in.

17. The method according to claim 11 wherein said product comprises a plate 4 to 6 inches thick and wherein said plate before or after any shaping has after artificial aging an L yield strength of at least 60 ksi, an ST yield strength of at least 57 ksi, an L-T fracture toughness $K_{1c}$ at RT of at least 30 ksi√in, and an SCC resistance of at least 25 ksi.

18. In the method according to claim 11 wherein said product comprises a plate 4 to 6 inches thick and wherein said plate before or after any shaping, has, after artificial aging, an L yield strength of at least 63 ksi, and an L-T fracture toughness $K_{1c}$ at RT of at least 30 ksi√in.

19. In the method according to claim 11 wherein said product comprises a plate more than 6 inches thick and wherein said plate before or after any shaping, has, after artificial aging, an L yield strength of at least 60 ksi, an ST yield strength of at least 54 ksi, and an L-T fracture toughness $K_{1c}$ at RT of at least 23 ksi√in.

20. In the method according to claim 11 wherein said product comprises a plate more than 6 inches thick and wherein said plate before or after any shaping, has, after artificial aging, an ST yield strength of at least 54 ksi and an L-T fracture toughness $K_{1c}$ at RT of at least 30 ksi√in.

21. In the method according to claim 11 wherein said product comprises a plate more than 6 inches thick and wherein said plate before or after any shaping, has, after artificial aging, an L yield strength of at least 62 ksi, and an L-T fracture toughness $K_{1c}$ at RT of at least 24 ksi√in.

22. In the method according to claim 11 wherein said product comprises a plate 4 to 6 inches thick and wherein said plate before or after any shaping, has, after artificial aging, an L yield strength of at least 60 ksi, an ST yield strength of at least 57 ksi, and an L-T fracture toughness $K_{1c}$ at RT of at least 32 ksi√in.

23. In the method according to claim 11 wherein said product comprises a plate more than 6 inches thick and wherein said plate before or after any shaping, has, after artificial aging, an L yield strength of at least 60 ksi, an ST yield strength of at least 54 ksi, and an L-T fracture toughness $K_{1c}$ at RT of at least 27 ksi√in.

24. In the method according to claim 11 wherein said product comprises a plate less than 2½ inches thick and wherein said plate before or after any shaping has after artificial aging an L yield strength of at least 71 ksi, an L-T fracture toughness $K_{1c}$ at RT of at least 42 ksi√in and a minus 65° F. L-T fracture toughness $K_{1c}$ of at least 37 ksi√in.

25. The method according to claim 11 wherein said alloy product is an extrusion.

26. The method according to claim 11 wherein said alloy product is a forging.

27. In the method according to claim 11 wherein said product comprises a plate 2½ to 4 inches thick and wherein said plate before or after any shaping, has, after artificial aging, an L yield strength of at least 63 ksi, and an L-T fracture toughness $K_{1c}$ at RT of at least 36 ksi√in.

28. In the method according to claim 11 wherein said product comprises a plate more than 6 inches thick and wherein said plate before or after any shaping, has, after artificial aging, an L yield strength of at least 60 ksi, an ST yield strength of at least 54 ksi, and an L-T fracture toughness $K_{1c}$ at RT of at least 31 ksi√in.

29. In the method according to claim 11 wherein said product comprises a plate less than 2½ inches thick and wherein said plate before or after any shaping, has, after artificial aging, an L yield strength of at least 70 ksi, an L-T fracture toughness $K_c$ at RT of at least 145 ksi√in.

30. The method according to claim 11 wherein said alloy is a plate.

31. In the method according to claim 11 wherein said product comprises plate 2½ to 4 inches thick and said plate before or after any shaping, has, after artificial aging, an L yield strength of at least 64 ksi, and an L-T fracture toughness $K_{1c}$ at RT of at least 35 ksi√in.

32. In the method according to claim 11 wherein said product comprises a plate less than 2½ inches thick and said plate before or after any shaping, has, after artificial aging, an L yield strength of at least 71 ksi, an LT yield strength of at least 69 ksi, an L-T fracture toughness $K_{1c}$ at RT of at least 43 ksi√in and an L-T fracture toughness $K_{1c}$ at minus 65° F. of at least 38 ksi√in.

33. In a method of making a wing for a commercial aircraft wherein an upper wing skin member and a spaced apart therefrom lower wing skin member are arranged to cooperate in providing structural strength to said wing member and wherein said upper and lower wing skin members are bridged by an artificially aged aluminum alloy spar member shaped from a rolled aluminum alloy plate product, the improvement wherein the metal for said rolled plate product is provided as an aluminum alloy consisting essentially of about 6 to 6.7% zinc, about 1.6 to 1.86% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

34. In a method according to claim 33 wherein the upper wing skin comprises a 7xxx aluminum alloy and the lower wing comprises a 2xxx aluminum alloy.

35. In the method according to claim 33 wherein the lower wing skin comprises an alloy consisting essentially of about 6 to 6.7% zinc, about 1.65 to 1.95% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

36. In the method according to claim 33 wherein the upper wing skin comprises an alloy consisting essentially of about 7.6 to 8.4% zinc, about 1.8 to 2.2% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

37. In the method according to claim 36 wherein the lower wing skin comprises an alloy consisting essentially of about 6 to 6.7% zinc, about 1.65 to 1.95% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

38. A method of producing an artificially aged aluminum alloy structural member for a commercial jet aircraft comprising providing a body of alloy consisting essentially of about 6 to 6.7% zinc, about 1.6 to 1.86% magnesium, about 1.8 to 2.4% copper, about 0.08 to about 0.15% zirconium, not more than about 0.06% silicon, not more than about 0.06% iron not more than about 0.11% iron plus silicon, the balance aluminum, incidental elements and impurities;

homogenizing said alloy to provide an homogenized alloy, hot rolling said homogenized alloy into a plate to provide a hot rolled alloy plate, solution heat treating the hot rolled alloy plate to provide a solution heat treated alloy plate, quenching said solution heat treated alloy plate to provide a quenched alloy plate, artificially aging said quenched alloy plate to provide an artificially aged alloy plate, the plate being at least 4 inches thick and substantially unrecrystallized and having an L yield strength of at least 62 ksi, an LT yield strength of at least 61 ksi, an ST yield strength of at least 54 ksi, an L-T fracture toughness $K_{1c}$ at RT of at least 28 ksi√in, and a T-L fracture toughness $K_{1c}$ at RT of at least 22 ksi√in.

39. In a method wherein an artificially aged aluminum alloy aircraft structural member is made from an aluminum alloy product, said method including machining said product to a shape for said structural member, the improvement wherein said product comprises an aluminum alloy consisting essentially of about 5.9 to 6.7% zinc, about 1.6 to about 1.86% magnesium, about 1.8 to 2.4% copper, about 0.08 to about 0.15% zirconium, not more tan about 0.06% silicon, not more than about 0.06% iron, not than about 0.11% iron plus silicon, the balance aluminum, incidental elements and impurities.

40. In the method according to claim 39 wherein said product is plate.

41. In the method according to claim 39 wherein said product is plate that is substantially unrecrystallized.

42. In the method according to claim 39 wherein said product is an extrusion.

43. In the method according to claim 39 wherein said product is a forging.

44. In the method according to claim 39 wherein said product comprises plate 4 to 6 inches thick and said plate before or after any shaping, has, after artificial aging, an L yield strength of at least 61 ksi, an ST yield strength of at least 57 ksi, an L-T fracture toughness $K_{1c}$ at RT of at least 33 ksi√in, and an L-T fracture toughness $K_{1c}$ at minus 65° F. of at least 26 ksi√in.

45. In the production of an aircraft assembly or subassembly comprising aluminum alloy structural members which are made from aluminum alloy products, the improvement wherein one or more of said aluminum alloy products is provided in an aluminum alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

46. In an aircraft comprising aluminum alloy structural members made from aluminum alloy products, the improvement wherein one or more of said aluminum alloy products is provided in an aluminum alloy consisting essentially of about 5.9 to 6.7% zinc, about 1.6 to 1.86% magnesium, about 1.8 to 2.4% copper, about 0.08 to about 0.15% zirconium, not more than about 0.06% silicon, not more than about 0.06% iron, not more than about 0.11% iron plus silicon, the balance aluminum, incidental elements and impurities.

* * * * *